July 7, 1931.  H. K. KOUYOUMJIAN  1,813,409

ALTERNATING CURRENT CONTROLLING APPARATUS

Filed Nov. 21, 1928

INVENTOR
Aaroutiun K. Kouyoumjian
BY
Edwards, Sager & Bower
his ATTORNEYS

Patented July 7, 1931

1,813,409

UNITED STATES PATENT OFFICE

HAROUTIUN K. KOUYOUMJIAN, OF PROVIDENCE, RHODE ISLAND, ASSIGNOR TO WARD LEONARD ELECTRIC COMPANY, A CORPORATION OF NEW YORK

ALTERNATING CURRENT CONTROLLING APPARATUS

Application filed November 21, 1928. Serial No. 320,908.

This invention relates to apparatus for controlling the energy and voltage supplied to a translating device or devices where the energy is derived from an alternating current source and where alternating current is utilized to effect the desired control. It is particularly useful as dimmer controlling means for controlling a lamp load from full brilliancy of the lamps to complete block-out of the lamps, such for example where lamps are controlled in theatres or moving picture displays and the like for producing desired lighting effects in harmony with the scenes produced. The invention also relates to an improved alternating current reactor for the control of the voltage or energy supplied to a translating device for any required purpose.

One of the main objects of the invention is to produce an improved method and improved type of controlling apparatus adapted to be embodied in a simple form of controlling apparatus where the alternating current energy derived from the alternating current source is controlled by alternating current energy which may conveniently be derived from the same source. Another object is to produce any desired control even over a wide range of voltage and energy supplied to the device or devices controlled without the necessity of a large wasteful consumption of energy in the controlling apparatus. Another object is to reduce the cost of construction and size of the apparatus for securing the desired control. Another object is to produce an improved form of reactor for the purpose intended which will be simple in the form of its construction and adapted to be manufactured and assembled at a comparatively low cost. Other objects and advantages of this invention and its various applications will be understood from the following description and accompanying drawings which illustrate preferred forms thereof.

Figure 1:
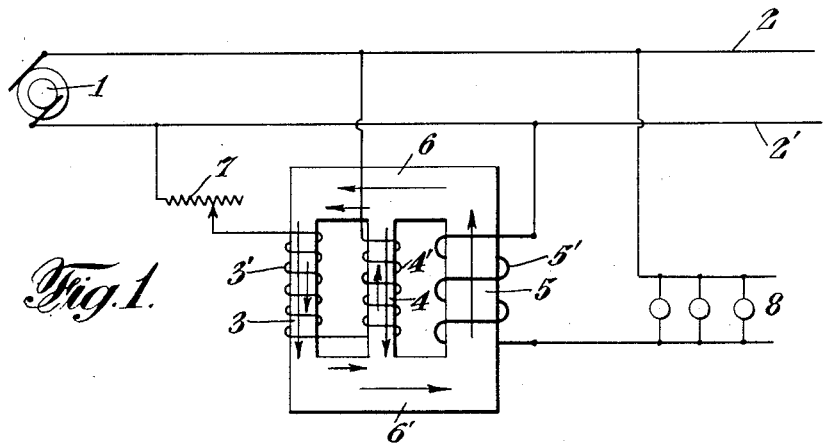
Figure 2:
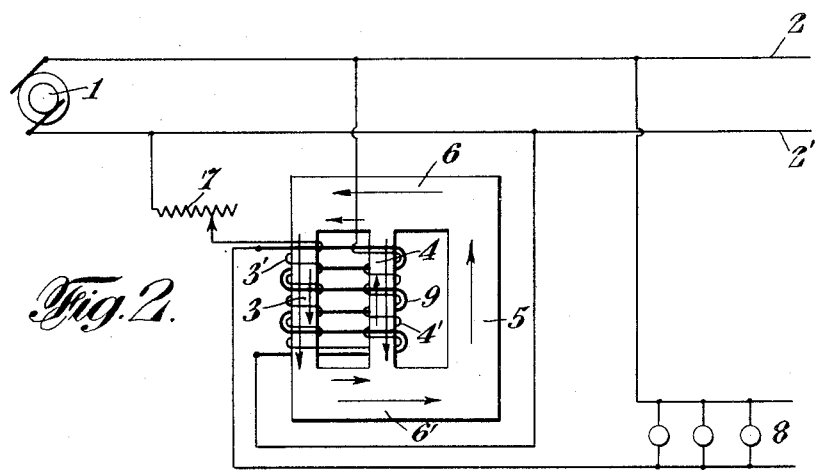
Figure 3:
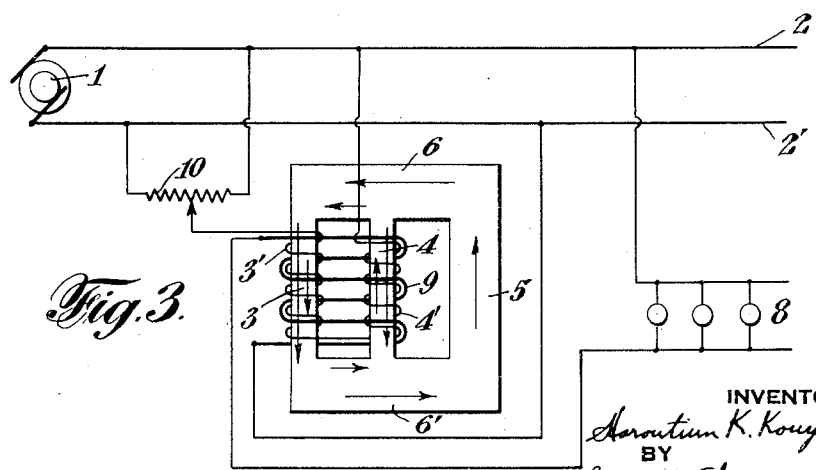

Fig. 1 is a diagrammatic view showing an embodiment of the invention and its application to the control of a lamp load; Fig. 2 is a similar view of a modification; and Fig. 3 is a similar view showing the form of reactor of Fig. 2 with a modification of the arrangement of control for varying the excitation of the controlling windings.

Referring to Fig. 1, a source of alternating current 1 is indicated as supplying energy to the supply lines 2, 2'. The reactor is indicated as made up of three parallel legs 3, 4 and 5 connected at the top and bottom by cross-pieces 6, 6'. The reactor is built up of laminæ and the cross-section of each of the legs 3, 4 is preferably about one-half of the cross-section of the leg 5, the upper and lower connecting portions having about the same cross-section as that of the leg 5. The legs 3 and 4 each carry individual windings 3', 4' preferably connected in series with each other, and the direction of these two windings is such that they act cumulatively with reference to each other in the excitation of their cores, the path of the flux in the cores due to these windings being indicated by the short arrows, thus tending to produce a localized flux through one portion of the core of the reactor. An adjustable rheostat 7, which may be of any desired form, is shown connected in series with the windings 3', 4' across the supply lines 2, 2'. These windings 3' and 4' are thus supplied with alternating current and the rheostat 7 is adapted to vary the value of the alternating current passing through these windings. Another alternating current winding 5' envelopes the leg 5 of the reactor and is connected in series with the lamp load 8 across the alternating current supply lines 2, 2'. The path of the magnetic flux in the reactor tending to be set up by current passing through the winding 5' is indicated by the long arrows and tends to pass from within the winding 5' through one of the cross-pieces, then through the smaller legs and back through the other cross-piece to the leg 5. It will be understood that the direction of the arrows indicate only an instantaneous condition and that their direction will be reversed during the reversal of the direction of the alternating current. It will also be understood that the direction of the turns of the winding 5' may be reversed from that shown, in which event its magneto motive force will be additive to that of winding 4' and opposite to that of winding 3';

and it will also be understood that wherefrom the character of the load, or from other causes, the phase of the current of the winding 5' is displaced from that of the current in the windings 3', 4', the reactor is nevertheless operative to produce the desired control.

In order to understand the operation, it may be assumed, for example, that the full amount of the resistance of the rheostat 7 is cut into the circuit of the windings 3', 4' and that the current therein is reduced to a minimum. The core of the reactor is then not magnetized to any appreciable, or materially influential, degree by the current passing through the windings 3', 4'.

Under this condition, the lamps will be at their minimum of brightness, or at a complete block-out, because the current permitted to pass through the winding 5' is then a minimum. This will be understood from the fact that the excitation of the reactor core due to the current in the winding 5' is then a maximum, causing maximum counter-electro motive force to be impressed upon the winding 5', thereby reducing the current through the same to a minimum. On the other hand, if the resistance of the rheostat 7 is completely cut out, the exciting current passing through the windings 3', 4' will be a maximum, and cause maximum energization of the part of the core in which the flux, due to these windings, passes. Under these conditions the magnetization of the core due to these windings should preferably be such as to bring it to or near saturation. The permissible curent passing through the winding 5' will then be a maximum and the lamps will be at their maximum brilliancy. This will be understood by reason of the fact that no appreciable counter-electro-motive force is impressed upon the winding 5', because no appreciable change of flux will occur within the winding 5', because the flux tending to be created by the winding 5' cannot pass through, to any appreciable extent, the portion of the core which is already saturated, or nearly saturated by the flux due to the windings 3', 4'. It is evident that intermediate adjustments of the resistance 7 will give any desired intermediate control of energy and voltage supplied to the translating device or devices, the control from minimum to maximum conditions, or the reverse, being accomplished smoothly.

In the modification shown in Fig. 2, the winding 5' of Fig. 1 directly controlling and in series with the load is indicated as winding 9 and in this case is shown as enveloping the two legs 3, 4 of the reactor core and also enveloping the windings 3', 4'. The method of control in the form of Fig. 2 is similar to that already described with reference to Fig. 1, but the form shown in Fig. 2 is advantageous in some cases.

The modification shown in Fig. 3 is similar to that of Fig. 2, except the control of the current in windings 3', 4' is obtained by an adjustable resistance of potentiometer form, the resistance 10 being connected directly across the supply wires 2, 2' and the adjustable contact being connected to the windings. In this form, the current supplied to the windings 3', 4' may be adjusted, depending upon the position of the adjustable resistance contact, from zero current obtained when the contact is at the extreme right in the form shown, to maximum current when the adjustable contact is at the extreme left in the form shown, all of the resistance then being cut out of the circuit of the windings.

In some cases, the windings 3', 4' may be connected in parallel with each other and in turn in series with the controlling resistance. Also, any suitable means may be used for changing the value of current in the windings 3', 4', other than by use of a variable resistance. It will also be understood that the number of turns of the windings on the reactor core will be made such as to suit the particular requirements, the drawings being diagrammatic as to illustration of number of turns and relative location. It will also be understood that the form of the reactor core may be made different from that indicated in the drawings, provided the proper relationship of the paths of the magnetic flux and of the windings is obtained.

Obviously, this invention is applicable to various purposes and subject to various modifications without departing from the scope thereof.

I claim:

1. Controlling apparatus adapted to be supplied from a source of alternating current energy comprising a core having alternating current windings thereon, means for varying the alternating current in one of said windings, and another of said windings being in series with the load and supplied with alternating current energy from said source, the path of the flux of said last-named winding through said core including a portion of said core additional to that followed by the flux created by said first-named winding.

2. Controlling apparatus adapted to be supplied from a source of alternating current energy comprising a core having a plurality of legs, alternating current exciting windings on at least two of said legs respectively, said windings acting cumulatively with reference to each other, means for varying the alternating current supplied to said two windings, and a third alternating current winding on said core in series with the load and with said source of alternating current energy, said third winding acting cumulatively with reference to one of said two windings and in opposition with reference to the other.

3. Controlling apparatus adapted to be supplied from a source of alternating current energy comprising a core, an alternating current exciting winding thereon having a local path in said core for the flux created thereby, means for varying the alternating current passing through said winding, and another alternating current winding on said core connected in series with the load and with said source and having a path for the flux created thereby which includes said local path and also a path through an additional portion of said core.

4. Controlling apparatus adapted to be supplied from a source of alternating current energy comprising a core, alternating current exciting windings on portions of said core acting to cumulatively magnetize a portion of said core in a local path for the flux created thereby, means for varying the current supplied to said windings, and another winding on said core connected in series with the load and with said source and having a path for the flux created thereby which includes said local path, and also a path through an additional portion of said core.

5. Controlling apparatus adapted to be supplied from a source of alternating current energy comprising a core, at least two alternating current exciting windings on said core acting to cumulatively magnetize a portion of said core in a local path for the flux created thereby, and another winding on said core connected in series with the load and with said source acting cumulatively with reference to one of said windings and oppositely with reference to the other of said windings and the path for the flux of said additional winding including said local path, and also a path through an additional portion of said core.

6. Controlling apparatus adapted to be supplied from a source of alternating current energy comprising a core having two portions and windings thereon acting to cumulatively magnetize said two portions, means for varying the current supplied to said windings, and a third winding enveloping said two portions and connected in series with the load and with said source and having a path for the flux of said third winding addition to that of said two windings.

7. Controlling apparatus adapted to be supplied from a source of alternating current energy comprising a core having three parallel legs, windings on two of the legs, respectively, acting to cumulatively magnetize said two legs, means for varying the alternating current supplied to said two windings, and a third winding connected in series with the load and with said source and having a path for the flux created by said third winding which includes said two legs of the core and also the third leg of the core.

8. Controlling apparatus adapted to be supplied from a source of alternating current energy comprising a core having three parallel legs, windings on two of the legs, respectively, acting to cumulatively magnetize said two legs, means for varying the alternating current supplied to said two windings, and a third winding connected in series with the load and with said source and located on the third leg of the core.

9. Controlling apparatus adapted to be supplied from a source of alternating current energy comprising a core having three parallel legs, windings on two of the legs, respectively, acting to cumulatively magnetize said two legs, means for varying the alternating current supplied to said two windings, and a third winding connected in series with the load and with said source enveloping said two legs of the core and completing its magnetic path through the third leg of the core.

10. An alternating current reactor comprising a core having a plurality of legs, alternating current exciting windings on at least two of said legs, respectively, said windings acting cumulatively with reference to each other, and a third alternating current exciting winding on said core acting cumulatively with reference to one of said windings and in opposition with reference to the other.

11. An alternating current reactor comprising a core, an alternating current exciting winding thereon having a local path in said core for the flux created thereby, and another alternating current exciting winding on said core having a path for the flux created thereby which includes said local path and also a path through an additional portion of said core.

12. A reactor comprising a core, alternating current exciting windings on portions of said core acting to cumulatively magnetize a portion of said core in a local path for the flux created thereby, and another alternating current exciting winding on said core having a path for the flux created thereby which includes said local path and also a path through an additional portion of said core.

13. A reactor comprising a core, at least two alternating current exciting windings on portions of said core acting to cumulatively magnetize a portion of said core in a local path for the flux created thereby, and another alternating exciting winding on said core acting cumulatively with reference to one of said two windings and oppositely with reference to the other of said two windings and the path of the flux of said additional winding including said local path and also a path through an additional portion of said core.

HAROUTIUN K. KOUYOUMJIAN.